No. 850,276. PATENTED APR. 16, 1907.
K. SULZBERGER.
DYNAMO ELECTRIC MACHINE.
APPLICATION FILED APR. 3, 1906.

Witnesses:

Inventor:
Karl Sulzberger,
by
Atty

UNITED STATES PATENT OFFICE.

KARL SULZBERGER, OF BERLIN, GERMANY, ASSIGNOR TO GENERAL ELECTRIC COMPANY, A CORPORATION OF NEW YORK.

DYNAMO-ELECTRIC MACHINE.

No. 850,276.     Specification of Letters Patent.     Patented April 16, 1907.

Application filed April 3, 1906. Serial No. 309,640.

*To all whom it may concern:*

Be it known that I, KARL SULZBERGER, a citizen of Switzerland, residing at Berlin, Germany, have made certain new and useful Improvements in Dynamo-Electric Machines, of which the following is a specification.

My invention relates to dynamo-electric machines of the commutator type employing a compensating winding for neutralizing the armature reaction and producing a commutating-field; and its object is to provide a novel connection of such a winding by means of which the compensating and commutating fields may be readily adjusted independently of each other. In machines of this type as arranged heretofore the compensating and commutating fields have been produced by a single winding, the compensating winding simply having a few extra turns at the proper point for producing the commutating field and all the turns for each pole being connected directly in series with each other.

By my invention I separate a portion of the winding which produces the commutating-field in whole or in part from the rest of the compensating winding for that pole and connect all of these parts in a group independent of the rest of the winding, which is connected in a second group. The two groups may then be connected in series with each other, and the portion of the winding which produces the commutating-field may be shunted by an adjustable resistance, and the rest of the winding may be shunted by another adjustable resistance, so that the commutating and compensating fields may be adjusted independently of each other.

My invention will best be understood by reference to the accompanying drawings, in which—

Figure 2:
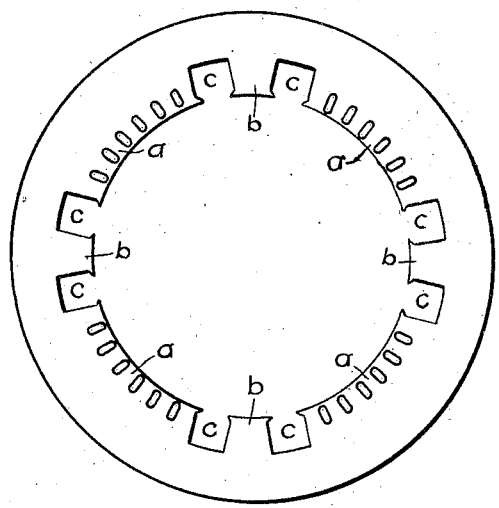
Figure 1:
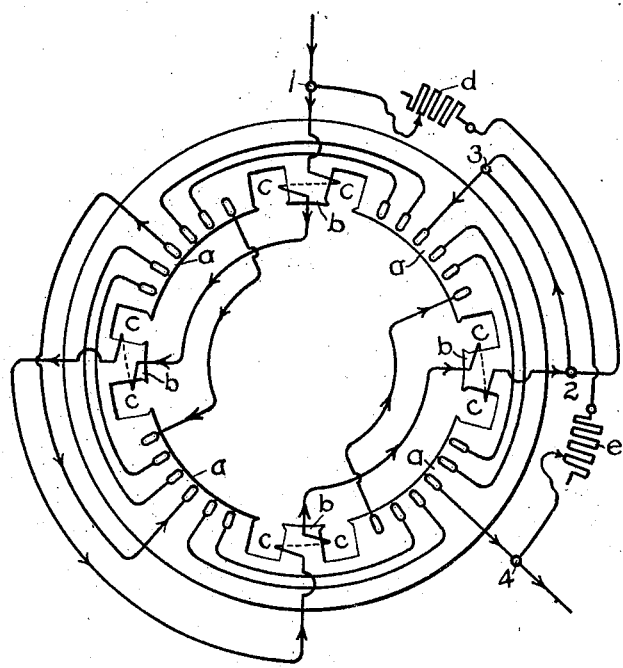

Figure 1 shows diagrammatically a field-magnet of a dynamo-electric machine provided with a compensating winding arranged and connected in accordance with my invention, and Fig. 2 shows the field-magnet with the winding removed.

In direct-current machines with a compensating winding for neutralizing the armature reaction the field-magnet is preferably arranged, as shown in Patent No. 741,234, issued to Deri October 13, 1903, like the stator of an alternating-current motor, in the form of a ring without projecting poles, on the inner periphery of which the windings are placed in slots or holes. These slots or holes, however, are not ordinarily, as in an alternating-current machine, uniformly distributed over the periphery of the field-ring, but on that portion of the ring surrounded by the main field-coils, which portion is indicated at $a$ in the drawings. Similar holes or slots of uniform size are distributed so that the teeth formed by these slots are of uniform size, while between each two field-poles the larger tooth $b$ is arranged, which has on each side of it a large slot $c$, in which are placed the main field-coils. The teeth $b$ form the commutating poles or lugs which produce sparkless commutation. In the slots $c$, in addition to the main field-coils, which are not shown and each of which extends from a slot $c$ on one side of the tooth $b$ to the nearest slot $c$ on one side of an adjacent tooth $b$, as shown in Patent No. 741,234 above mentioned, is placed that portion of the compensating winding which produces the commutating-field. The rest of the compensating winding is distributed through the slots in the portions $a$ of the field-ring which form the main field-poles of the machine.

The arrangement of the compensating winding is shown in Fig. 2. It will be seen that the main portion of the compensating winding produces a flux distributed over the periphery for neutralizing armature reaction, only a portion of the flux of each coil of the main compensating winding passing through the commutating lugs $b$, while the entire flux of that portion of the compensating winding directly surrounding the lug $b$ passes through those lugs and is particularly effective for producing the commutating field.

The theory of such machines shows that in order to produce sparkless commutation not only must the compensating winding have the necessary ampere-turns for neutralizing the armature reaction, but a certain excess of ampere-turns is necessary for producing the commutating field in the commutating pole. In order to produce this result, extra turns of the compensating winding are placed directly around the commutating-lug. If all the coils of the compensating winding for each pole are connected directly in series and then in series with the compensating winding of the other poles, as is the usual practice, then an adjustment of the commutating-field will vary the entire compensating effect, and vice versa. For instance, if it is necessary to strengthen the commutating-field in order to produce proper commutation the armature reaction may be over compensated by the adjustment so as to produce a cross-field in the opposite direction to that in a machine not compensated. Of course independent adjustment may be obtained by adjusting the number of turns of the portion of the compensating winding which produces the commutating-field relative to the other portion; but this is exceedingly inconvenient.

By my invention the compensating and commutating-fields may be regulated independently in a simple manner. For this purpose instead of connecting all the compensating turns for each pole directly together in the usual way I connect all those portions of the commutating windings of the several poles directly together which are particularly effective in producing the commutating field and then connect the group formed by these portions in series with a second group formed by the remaining turns of the compensating winding. I can then shunt each group by an adjustable resistance, and in this way adjust independently the current strength through the commutating-field of the winding and the other portions, and thereby adjust independently the strength of the compensating and commutating - fields. This connection is shown diagrammatically in Fig. 1. If the current is supposed to enter at the terminal 1, it will be seen that it divides, a part passing through the portions of the compensating windings for the several poles which produce the commutating-fields to the terminal 2, while the other part of the current passes through the variable resistance $d$ to the terminal 2. From there the current passes to terminal 3, at which point it again divides, a part passing through the main portion of the compensating winding to terminal 4 and the other part passing through the variable resistance $e$ to terminal 4. Evidently with this arrangement by adjusting the resistances $d$ and $e$ the relative strengths of the compensating and commutating fields may be adjusted.

I do not desire to limit myself to the particular construction of field - magnet here shown, since my invention is not limited to any special type of field-magnet, but is applicable to any machine having a winding for compensating for armature reaction and producing a commutating field.

What I claim as new, and desire to secure by Letters Patent of the United States, is—

1. In a dynamo-electric machine of the commutator type, a field structure provided with a compensating and commutating winding, the commutating portions of the winding for the several poles of the machine being connected in a group and the remaining portions of the winding being connected in another group.

2. In a dynamo-electric machine of the commutator type, a field structure provided with a compensating and commutating winding, the commutating portions of the winding for the several poles of the machine being connected in series independently of the rest of the winding, and means for adjusting the relative amounts of current-flow through said commutating portions and the rest of the winding.

3. In a dynamo-electric machine of the commutator type, a field structure provided with a compensating and commutating winding, the commutating portions of the winding for the several poles of the machine being connected in a group and the remaining portions of the winding being connected in another group, and means for varying the relative amounts of current-flow through the two groups.

4. In a dynamo-electric machine of the commutator type, a field structure provided with a compensating and commutating winding, the commutating portions of the winding for the several poles of the machine being connected in a group and the remaining portions of the winding being connected in another group, said groups being connected in series, and a shunting resistance for adjusting the relative amounts of current-flow through said groups.

5. In a dynamo-electric machine of the commutator type, a field provided with a compensating and commutating winding, the commutating portions of the winding for the several poles being connected in a group and the remaining portions of the winding being connected in another group, said groups being connected in series, and independent resistance-shunts for the two groups.

6. In a dynamo-electric machine of the commutator type, a field structure with a compensating and commutating winding, the commutating portions of the winding for the several poles being connected in a group and the remaining portions of the winding being connected in another group, said groups being connected in series, and two adjustable resistances shunting said groups respectively.

In witness whereof I have hereunto set my hand this 17th day of March, 1906.

KARL SULZBERGER.

Witnesses:
JULIUS RÜMLAND,
KARL RICKEBEN.